Nov. 20, 1951 L. E. MILLS 2,575,354

FLEXIBLE MEASURING TAPE AND CASE THEREFOR

Filed April 18, 1949

INVENTOR

Lindley E. Mills

Patented Nov. 20, 1951 2,575,354

UNITED STATES PATENT OFFICE 2,575,354

FLEXIBLE MEASURING TAPE AND CASE THEREFOR

Lindley E. Mills, Kalamazoo, Mich.

Application April 18, 1949, Serial No. 88,126

6 Claims. (Cl. 33—189)

Figures 1, 2, 3, 4, 5, 6, 7, 8, 9, 10, 11:
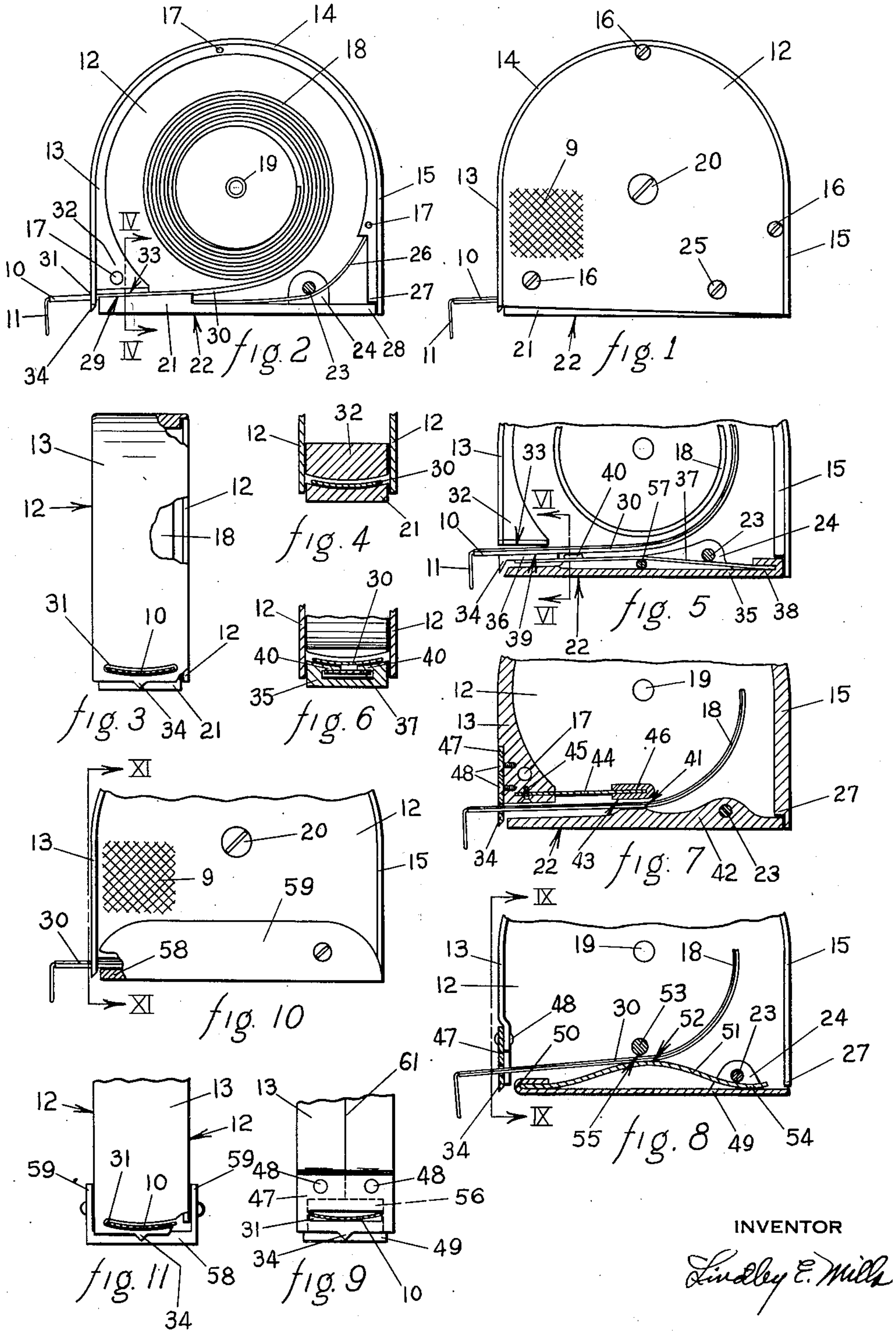

This invention relates to a measuring device, particularly to a flexible measuring tape adapted to be coiled in a case when not in use and to an improved case therefor.

The use of a flexible measuring tape, usually a thin strip of resilient tempered steel or other suitable metal, which is normally coiled, often under spring tension, within a case and which can be retrievably withdrawn through an opening in the front edge of the case for use, is widespread among carpenters, plumbers, masons, householders and other workers. As generally constructed such tapes are transversely concave on one side, usually on the top, and convex on the other and are frequently referred to as "concavo-convex" tapes or ribbons. Such a tape made of a good grade of tempered steel tends, when not restrained, to straighten and flatten itself longitudinally along a flat surface and thus makes a very convenient measuring device. Flat tapes, rather than tapes which are concavo-convex, have also been employed in similar fashion. Due to the flexible nature and thin cross-section of such tapes, they can be spring-tensioned and coiled in known manner in a small case for storage when not in use.

Such conventional flexible tape and case combinations suffer, however, from certain defects, one of which is the tendency of the tape to "creep" into or out of the case while the user is noting a measurement or securing and using a pencil or other marking instrument to mark off a measured distance on the work. Numerous devices and modifications have been proposed for locking the tape in a desired extended position. These devices have assumed various forms familiar to those conversant with the art. They are, however, all characterized by the necessity of operating a lever or other actuating device mounted on the outside of the case. This generally requires the use of both hands to actuate the mechanism to lock the tape or to unlock it thus making the operation awkward and not adapted to easy and automatic operation while the tape is extended along the work in a position for measuring. Furthermore, such devices do not eliminate the necessity of using a pencil or other instrument in one hand to mark or scribe the work and thus leave only one hand free to hold the tape or case while marking off a desired distance on the work. It is apparent that any improvement in measuring tapes which would overcome these and other difficulties would be of considerable value.

It is, therefore, an object of the present invention to provide a flexible tape and a case therefor having a mechanism for locking the tape in an extended position.

An additional object is to provide a case for a flexible measuring tape including means for locking the tape in an extended position which can be operated easily and positively with one hand.

An additional object is to provide a means for locking a flexible tape, normally coiled in a case, in an extended position without removing the hand from the case and while the other hand is free to grasp the extended portion of the tape to hold it in position during the locking operation.

An additional object is to provide means for locking a flexible tape, normally coiled in a case, in an extended position which can be operated by moderate pressure of the case on the work.

An additional object is to provide a case for a flexible tape having a mechanism for locking the tape in an extended position which mechanism automatically releases the tape when the need for locking the tape has passed.

An additional object is to provide a case for a flexible measuring tape having an easily and conveniently operated automatic locking mechanism for the tape.

An additional object is to provide a case for a flexible tape having cooperating scribing means and locking means for the tape characterized by exposure of the scribing means in a scribing position when the tape is locked and by withdrawal of the scribing means into a non-exposed, non-scribing position when the tape is not locked.

An additional object is to provide a case for a flexible measuring tape having automatically retractable scribing means.

These and related objects are accomplished readily and economically by providing a flexible tape and a case therefor from which the tape can be retrievably withdrawn, generally against tension of a spring for recoiling it in the case, the case having side members and rear, top and front edge members, all of substantially conventional design and arrangement. The bottom edge member or base member of the case is, however, pivotally mounted so that it can be rotated through a small arc in the same plane as the plane of the coiled tape by the application of external pressure thereon, e. g. by pressing the front edge of the case downward on the work.

In one modification of the invention, a pair of tape-breaking surfaces, one or either of which can, if desired, be spring-tensioned, are provided, the upper one of which is positioned above and adjacent to the short uncoiled section of the tape inside the case which extends between the coiled section of the tape and the withdrawal port, and the lower one of which is positioned below the tape opposite the upper tape-braking surface, and both of which are so arranged that, when the base member is rotated by external pressure thereon, the two surfaces grip the tape firmly between them and effectively retard or prevent its longitudinal movement.

In a further modification of the invention, a scriber point is also provided and mounted on a member of the case other than the base member so that it normally is in a retracted or protected non-scribing position such that it is not readily injured by careless handling of the measuring device and such that it will not scratch other tools or smooth surfaces or tear clothing with which the device may come into contact during ordinary transportation, storage, and handling between periods of use. When, however, the base member is rotated in the manner described, the scriber point assumes an exposed or projected position wherein it is available for scribing the work at a desired location, e. g. by sliding the case laterally for a short distance on the surface of the work.

In certain instances contemplated by the invention wherein braking or locking of the tape may not be desirable, the tape-braking surfaces mentioned can be omitted, the pivoted base member then serving as a means for protecting the scriber point when the device is not in use.

As a practical matter, the extent of rotation of the base member in the direction described is limited, e. g. by the compressive resistance of the tape-braking surfaces on the tape, or, in cases where braking of the tape is not effected, by an appropriate stop or arresting means which serves to prevent undue extension or projection of the scriber point into an exposed scribing position. A stop or arresting means is also generally provided to prevent rotation of the base member in the opposite direction past its "normal" position. The base member can, if desired, be spring-tensioned to insure its returning to its "normal" position when the device is not in use.

For convenience in nomenclature, the walls of the case lying in planes parallel to the plane of the coiled tape in the case are herein referred to as "side-members," the edge member normally placed in contact with the work when the device is used on a flat surface is referred to as the "bottom edge member" or "base member," the edge member opposite the base member, which is often arcuate, is referred to as the "top edge member" and the edge members extending substantially between the ends of the top edge member and the base member are referred to as the "front edge member" and the "rear edge member," respectively, the withdrawal port for the tape being in or adjacent the lower end of the member referred to as the "front edge member." The edge members, with the exception of the base member hereinafter described, thus extend between and serve to join and space the peripheries of the side members. The meanings of the terms "downward," "forward," "upward" and "rearward" and their equivalents are apparent from the foregoing. Rotation of the base member in the direction for braking the tape or for exposing the scriber point is herein referred to as rotation in the "forward" direction, rotation in the opposite direction being referred to as rotation in the "rearward" direction. The base member is said to be in its "normal" position when rotated in the rearward direction to the extent of its travel. In a similar fashion, the upper and lower tape-braking surfaces and the scriber point are referred to as being in their "normal" positions or locations with respect to other members of the device when the base member is in its normal position.

The invention can be better understood by reference to the accompanying drawing wherein, in the interest of clarity, certain features are shown on a somewhat exaggerated scale and wherein:

Figure 1 is a side elevation of a case containing a coiled flexible measuring tape and embodying features of the invention, Figure 2 is a side elevation of the case and tape of Figure 1, but with one side of the case removed, showing one arrangement of the parts, Figure 3 is a front elevation of the case and tape of Figure 1 with sections of the front edge member of the case cut away and the withdrawn portion of the tape in section, Figure 4 is a partial sectional elevation along the line IV—IV of Figure 2, Figure 5 is a partial side elevation, partially in section, of a case containing a flexible measuring tape, but with one side of the case removed, showing a different arrangement of the parts, Figure 6 is a partial sectional elevation along the line VI—VI of Figure 5, Figure 7 is a partial side sectional elevation of a case containing a flexible measuring tape showing yet another arrangement of the parts, Figure 8 is a partial side elevation, partially in section, of a case containing a flexible measuring tape, but with one side of the case removed, showing yet another arrangement of the parts, Figure 9 is a partial front elevation along the line IX—IX of Figure 8, Figure 10 is a partial side elevation, partially in section, of a case containing a flexible measuring tape showing yet another arrangement of certain of the parts, and Figure 11 is a partial front elevation along the line XI—XI of Figure 10.

Referring to Figures 1, 2, 3 and 4, a conventional, flexible tape 10 of tempered metal and having a conventional hook 11 secured to the outer end thereof is shown projecting through a withdrawal port 31 in the front edge member 13 of a case having a pair of side members 12, an arcuate top edge member 14 and a rear edge member 15, all of conventional design. The sides 12 of the case preferably have roughened or knurled sections 9 on their outer surfaces to provide convenient holding surfaces. The front, top and rear edge members are formed integral with one of the side members 12 and have threaded holes 17 formed therein, as shown particularly in Figure 2, by means of which the other of the side members 12, in the form of a flat plate, is removably secured with screws 16 as shown more particularly in Figure 1. The main portion of the tape 10 inside the case is coiled, as shown partially at 18 of Figure 2, and secured at its inner end to one end of a spring, not shown, which in turn is coiled inside the coil of tape with its inner end secured to a center post or drum 19. A screw, 20 of Figure 1, is generally provided which can be turned into a threaded bore in the center post or drum 19 and serves as an additional means for securing the removable side member 12 to the case.

A base member 21 having a flat bottom surface 22 is provided and pivoted, as on a pivot shaft 23 extending between the two side members 12 of the case, so that it can rotate in the same plane as the plane of the coiled tape in response to pressure on its bottom surface. Any convenient means for mounting the base member 21 on the pivot shaft 23 can be provided, such as a pair of pivot flanges 24 secured along the edges of the base member 21 at substantially right angles thereto and drilled to receive the pivot shaft 23. Screws 25 of Figure 1 can be employed to anchor the pivot shaft 23 to the side members 12 of the case. Other ways of mounting the base member 21 so that it can be pivoted will be apparent. It is preferable that the pivot shaft 23 be located near the bottom edge of the side members 12 and rearwardly of the longitudinal center of the base member 21. A base member tensioning spring 26 can be provided, if desired, but is not essential, to maintain the base member 21 under tension and to cause it to be normally rotated in the rearward direction to the limit of its travel. The rotation of the base member 21 in the rearward direction is limited as by a shoulder 27 formed at the bottom of the rear edge member 15 against which the rear end 28 of the base member 21 normally rests as a result of the urging of the spring 26. The base member tensioning spring 26 can be conveniently positioned so as to bear intermediately on the under side of the pivot pin 23 and at its ends against the inner surfaces of the rear edge member 15 and the base member 21, respectively. Shoulders can be formed in the two latter members to prevent longitudinal travel of the spring 26. Other ways of mounting a base member tensioning spring will be apparent.

On the upper surface of the forward end of the base member 21 there is formed a lower tape-braking surface 29 which is substantially parallel to and normally immediately adjacent the uncoiled section 30 of the tape within the case which extends between the coiled section 18 and the withdrawal port 31. A block or anvil 32 is formed, e. g. integral with the front edge member 13 of the case, or as a separate member secured thereto, and having on the lower side thereof an upper tape-braking surface 33 opposite and arcuately conforming to the lower tape-braking surface 29.

The upper tape-braking surface 33 and the lower tape-braking surface 29 are formed and positioned so that when the base member 21 is in its normal position the distance between them is greater than the thickness of the tape and little or no braking action is exerted on the tape as it travels longitudinally between them. When, however, the base member 21 is rotated in the forward direction, as by placing the case on a board or other work with the bottom surface 22 of the base member 21 in flat surface contact therewith and pressing the forward edge of the case downward, the tape is gripped firmly between the two tape-braking surfaces 29 and 33 and its longitudinal movement between them retarded or prevented entirely, depending upon the pressure applied.

A scriber point 34 is formed at the lower end of the front edge member 13 of the case and in direct alignment with the outer or forward surface of the front edge member 13. The scriber point 34 projects downward for a distance such that when the base member 21 is in its normal position, the point 34 is above the level of the bottom surface 22 of the base member 21. The scriber point 34 is thus normally in a protected or retracted non-scribing position wherein it is not damaged by accidental contact of the case with hard surfaces, as in a tool box, and wherein it is not exposed so that it will damage work when the tape is used for conventional measuring and it is not desired either to lock the tape in position or to scribe the work. When, however, the base member 21 is rotated in the forward direction to lock the tape as previously described, the scriber point projects below the level of the bottom surface 22 of the base member 21 and is thus in a position for scribing. Upon release of the pressure on the base member 21, as by lifting the case from the work, the base member assumes its normal position causing the scriber point 34 to be retracted and the tape to be unlocked.

A somewhat different arrangement of the parts is shown in Figures 5 and 6 wherein there is shown a lower tape-braking surface 39 formed on a lower surface member 36 which is separate from the base member 35 but which is secured to one end of a lower surface-tensioning spring 37, the other end of which is secured as by a rivet or screw, or by being wedged into a slot 38 at the rear end of the base member 35. The spring 37 is positioned, as by resting over a pin 57 extending between the prolonged pivot flanges 24 so that it continuously urges the lower tape-braking surface member 36 upward toward the uncoiled section 30 of the tape. The spring 37 is, however, restrained in a tensioned position by one or more restraining members 40, illustrated more clearly in Figure 6, which are fixed with respect to the base member 35 and which limit its upward travel with respect thereto. The restraining members 40 are formed conveniently by bending lateral extensions of the base member 35 upwardly and inwardly to form a pair of rigid hook-like members, or in any other convenient way. It will be apparent from the following description that when the spring 37 rests against the restraining members 40, the spring and the lower surface member 36 should be separated somewhat from the surface of the forward end of the base member 35. The base member 35, the lower tape-braking surface member 36 and the lower surface-tensioning spring 37 are therefore free to rotate as a unit about the pivot shaft 23 and without changing their relative positions until such time as the base member 35 is rotated in a forward direction until the section of the tape 30 is clamped firmly between the tape-braking surfaces 33 and 39.

It is thus possible, in using the modification shown in Figures 5 and 6, to brake or lock the tape completely, depending upon the tension of the spring 37, before the scriber point 34, which is formed on the forward end of the lower surface member 36, projects past the lower surface 22 of the base member 35. When, however, additional pressure is exerted downward on the case, the spring 37 is flexed and the scriber point 34 is projected past the plane of the surface 22 and is then in a position for scribing the work. It is to be noted that the distance which the scriber point 34 projects past the surface 22 can be regulated within the limits of its travel by the degree of pressure applied downward on the case so that the scriber point 34 can be used for light or heavy scribing, all without disturbing or altering the braking action of the surfaces 33 and 39 on the tape. Furthermore, the tape can be locked in position, thus overcoming any tendency it may have to creep in or out of the case, and held in this position with one hand without contacting the scriber point with the surface of the work while the other hand is used for marking the work with a pencil in instances where scribing is undesirable.

Still another arrangement of the parts is illustrated in Figure 7 wherein the lower tape-braking surface 41 is formed on the base member 42 at a point substantially removed from the front end of the base member and nearer the pivot shaft 23 than in the modifications previously described thus insuring a greater leverage on the surface 41 when the front end of the base member 42 is pressed downward onto the work than is possible with the arrangements shown in Figures 1 to 6. The upper take-braking surface 43, positioned opposite the lower tape-braking surface 41, is spring mounted and tensioned as by an upper surface-tensioning spring 44 secured at one end with a rivet or screw 45, or in other conventional fashion, to the inner surface of the front edge member 13. The upper take-braking surface 43 can be formed by a tightly fitting cap 46 of rubber or other plastic slipped over the free end of the spring 44 or in other convenient ways. A separate scriber point plate 47 having a scriber point 34 formed on the lower edge thereof and a withdrawal port for the tape formed therein is secured to the front edge member 13 as by screws or rivets 48, preferably with the scriber point in direct vertical alignment with the forward surface of the member 13. When the base member 42 is rotated in a forward direction by pressing the case downward firmly on the work, the tape is first clamped between the lower tape-braking surface 41 and the upper tape-braking surface 43 and, upon exerting further pressure downward on the case, the base member 42 is rotated further in a forward direction causing the spring 44 to flex and permitting the scriber point 34 to project past the bottom surface 22 of the base member 42 in a position for scribing.

An alternative arrangement of the parts is shown in Figures 8 and 9 wherein the base member 49, pivoted on a pivot pin 23 by means of pivoting flanges 24 in a manner substantially as described before, has its forward portion 50 turned back on itself to form a clamp in which is secured one end of an arcuate or bowed spring 51. The other end 54 of the spring 51 rests on the inner surface of the base member 49 near its rearward end and is free to slide thereon. The uppermost projection of the spring 51 is positioned near the lower surface of the uncoiled portion 30 of the tape, the upper surface of the spring at its highest point 52 where it contacts the section 30 of the tape when the base member 49 is rotated in a forward direction constituting the lower tape-braking surface. The latter surface can be covered with leather or a plastic substance, if desired, to increase its frictional coefficient. Alternatively, the entire spring 51 can be made of a suitable plastic substance which has a suitable degree of flexibility. An upper tape-braking surface 55 is formed on an upper braking surface member 53 which is positioned above the section 30 of the tape in a position opposite the lower tape-breaking surface 52. The upper braking surface member 53 is conveniently formed as one or more pins projecting vertically from the inner surface of and secured to or formed integral with the side members 12 of the case.

It is to be noted that in the modification of Figures 8 and 9, the front, top and rear edge members are divided longitudinally along their centers with one half of each formed integral with its respective side member in conventional fashion to form two substantially identical halves of the case, exclusive of the base member, as is shown clearly in Figure 9 wherein the two halves are shown joined along the line 61. A separate scriber point plate 47 is secured as by screws or rivets 48 to the outer surface and at the lower end of the front edge member 13, and is preferably recessed therein. A scriber point 34 is formed on the lower edge of the scriber point plate 47 and a withdrawal port 31 for the tape 10 is formed in the plate 47 immediately above the scriber point 34. The two halves of the front edge member 13 can be formed with the section at the bottom of each along their adjoining edges cut away to form a relatively large opening or notch 56 at the bottom of the front edge member 31, the opening or notch being covered by the scriber point plate 47. The operation of this modification is similar to that described in Figure 7. When the bottom edge member 49 is placed in contact with the surface of the work and the case pressed downward, the tape is gripped firmly between the tape-braking surfaces 52 and 55 and, upon pressing the case more firmly downward onto the work, the spring 51 flexes and the scriber point 34 is projected into a scribing position.

In Figures 10 and 11 there is shown a modification of the invention wherein the base member 58 is wider than the rest of the case and has a pair of flanges 59 formed at right angles along its edges which overlap the outside of the side members 12 of the case, the entire base member including the flanges 59 pivoting about a pivot post or shaft extending through the flanges and the side members of the case. The tape-braking surfaces and the scriber point can in this instance be formed and operated substantially after the fashion illustrated in any of the figures described previously.

The tape-braking surfaces described and illustrated in the foregoing figures can be of metal or one or both of them can be of a substance having a higher coefficient of friction than metal; such as rubber or certain other plastic compositions. The tape-braking surfaces can be concave and convex, respectively, to fit the contour of the tape or they can be flat so as to flatten the tape between them and thus to increase somewhat the frictional resistance to longitudinal movement of the latter.

The scriber point is, as mentioned previously, secured to a member of the case other than the base member and at a point related by a convenient fixed distance to a point on the case which serves as a ready point of reference for reading the tape. The scriber point is conveniently located, as hereinbefore described, on the front edge member of the case and in a direct vertical line with the front surface of the front edge member, the front surface then serving as a ready reference point or line for reading the exact length of the section of the tape projecting outside the case and also for determining the exact point below which the scriber point is in contact with the work. In certain instances it is advantageous to form the scriber point on a separate member, e. g. on a hardened steel plate, which is subsequently secured to the case in a desired location, e. g. in a recess provided in the front edge member of the case. Other ways of mounting the scriber point will be apparent from the foregoing description.

I claim:

1. In a case for a coiled measuring tape having side members and front, rear and top edge members, the combination including: a pivotally mounted base member rotatable in the same plane as a coil of tape within the case; and a pair of tape-braking surfaces positioned within the case, at least one of said surfaces being movable in response to rotation of the base member to clamp a section of the tape between the surfaces and retard its longitudinal movement.

2. In a measuring device of the character described, the combination including: a flexible measuring tape normally coiled within a case and having its terminal end movable through a withdrawal port in the case; a pivotally mounted base member for the case rotatable in the same plane as the coil of tape; and a tape-braking means within the case actuable in response to rotation of the base member.

3. In a measuring device of the character described, the combination including: a flexible measuring tape normally coiled within a case and having its terminal end movable through a withdrawal port in the case; a pivotally mounted base member for the case adapted to rotate in the same plane as the coil of tape; a tape-braking means within the case actuable in response to rotation of the base member; and a scriber point normally in a retracted non-scribing position and extendable into a scribing position in response to rotation of the base member.

4. In a measuring device of the character described, the combination including: a flexible measuring tape normally coiled within a case and retrievably withdrawable through a withdrawal port in the case; a pivotally mounted base member for the case adapted to rotate in the same plane as the coil of tape; an upper tape-braking surface normally positioned adjacent the upper surface of an uncoiled section of the tape within the case; a lower tape-braking surface normally positioned adjacent the lower surface of the tape opposite the upper tape-braking surface; and means response to rotation of the base member to cause the tape-braking surfaces to grip the tape between them.

5. A device as claimed in claim 4 wherein the lower tape-braking surface is secured to the base member.

6. In a measuring device of the character described, the combination including: a flexible measuring tape normally coiled within a case and retrievably withdrawable therefrom through a withdrawal port; a pivotally mounted base member for the case adapted to rotate in the same plane as the coil of tape; facing upper and lower tape-braking surfaces normally positioned adjacent to but not in pressure contact with the upper and lower surfaces, respectively, of an uncoiled section of the tape within the case and adapted in response to rotation of the base member to grip the tape between them to effect braking of its longitudinal movement, at least one of the tape-braking surfaces being spring-mounted to permit continued rotation of the base member after braking of the tape is effected; and a scriber point normally in a retracted non-scribing position when the base member is in its normal position and during its rotation to effect braking of the tape and extendable into a scribing position in response to continued rotation of the base member after braking of the tape is effected.

LINDLEY E. MILLS.

REFERENCES CITED

The following references are of record in the file of this patent:

UNITED STATES PATENTS

| Number | Name | Date |
|---|---|---|
| 1,259,886 | McLeod | Mar. 19, 1918 |
| 2,065,143 | Metcalf | Dec. 22, 1936 |
| 2,132,202 | Carlson | Oct. 4, 1938 |
| 2,410,713 | Carlson | Nov. 5, 1946 |
| 2,446,020 | Nicholson et al. | July 27, 1948 |

FOREIGN PATENTS

| Number | Country | Date |
|---|---|---|
| 253,421 | Great Britain | June 17, 1926 |
| 607,177 | Great Britain | Aug. 26, 1948 |